United States Patent Office 3,225,049
Patented Dec. 21, 1965

3,225,049
6 - (1,2,3,4 - TETRAHYDRO - 2 - THIOXO - 4,4,6 - TRI-METHYL - 1 - PYRIMIDINYL)BENZOTHIAZOL-YLTHIOLCARBONATES
John J. D'Amico, Charleston, W. Va., and Ching C. Tung, Kirkwood, Mo., assignors to Monsanto Company, a corporation of Delaware
No Drawing. Original application Sept. 15, 1961, Ser. No. 138,296, now Patent No. 3,151,114, dated Sept. 29, 1964. Divided and this application Dec. 27, 1963, Ser. No. 334,040
6 Claims. (Cl. 260—256.5)

This application is a division of Serial No. 138,296, filed September 15, 1961, now Patent No. 3,151,114, September 29, 1964.

The present invention relates to 1,2,3,4-tetrahydro-1-(2 - mercapto-6-benzothiazolyl)-2-thioxo-4,4,6-trimethylpyrimidine and derivatives thereof.

1,2,3,4 - tetrahydro-1-(2-mercapto-6-benzothiazolyl)-2-thioxo-4,4,6-trimethylpyromidine can exist in two tautomeric forms as follows:

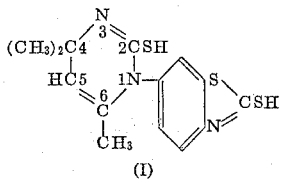

(I)

and

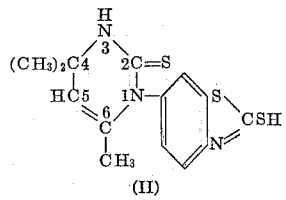

(II)

The structure is undoubtedly II predominately. For example a disodium salt does not form. Of course, the same tautomerism is possible in the mercaptothiazole nucleus but the mercaptan structure is generally accepted and is consistent with the chemical properties observed. The preparation and properties of this compound are described in detail below:

EXAMPLE 1

To a stirred slurry containing 79.0 grams (0.5 mole) of 1,1-dimethyl-3-oxobutylthiocyanic acid, 750 ml. of water and 6 grams of concentrated sulfuric acid was added in one portion 91.1 grams (0.5 mole) of 6-amino-2-mercaptobenzothiazole and the mixture heated at 80–90° C. for a period of 3 hours. After cooling to 25° C., the precipitate was collected by filtration, washed with water until the washings were neutral to litmus, and air-dried at 25–30° C. 1,4-dihydro-1-(2-mercapto-6-benzothiazolyl) 4,4,6-trimethyl-2-pyrimidinethiol (predominately 1,2,3,4-tetrahydro - 1 - (2-mercapto-6-benzothiazolyl)-2-thioxo-4, 4,6-trimethylpyrimidine) was obtained in 97.5% yield. After recrystallization from dilute ethyl alcohol it melted at 207–209° C. Analysis gave 13.07% nitrogen and 29.34% sulfur compared to 13.07% nitrogen and 29.72% sulfur calculated for $C_{14}H_{15}N_3S_3$. This compound accelerates vulcanization of natural and synthetic rubber and imparts considerable processing safety. It is also a valuable intermediate and undergoes reactions typical of those known for mercaptobenzothiazole involving the mercaptan radical.

Since the mercapto hydrogen in the thiazole ring is active, a variety of derivatives can be obtained by replacing the hydrogen by other groups, as for example salt-forming groups and organic radicals. Among the organic radicals which may replace hydrogen are alkyl, alkenyl, halogen substituted alkenyl, dialkylaminoethyl, 2-butenylene, 2-butynyl, 2-propynyl, 2-cyclohexenyl, 2-oxocyclohexyl, 5,5,7,7 - tetramethyl - 2 - octenyl, —$CH_2$—NH— groups such as

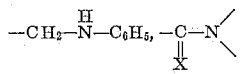

where X is sulfur or oxygen and the valences on the nitrogen may be satisfied by open or closed chain aliphatic radicals or divalent radicals which with nitrogen constitute a heterocyclic group, or phenyl,

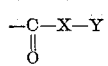

groups where X is sulfur or oxygen and Y is lower alkyl or alkenyl,

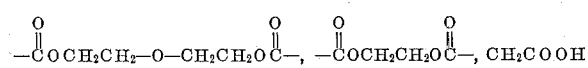

and chlorophenoxyacetyl. These, of course, are only illustrative of a few of the possible derivatives. All of them accelerate vulcanization to a greater or less degree. Replacing mercapto hydrogen with radicals which inactivate mercaptobenzothiazole do not appear to have the same effect on the product of Example 1. The term "free mercaptan" hereinafter designates the product of Example 1.

Thiolcarbonates

In the preparation of thiolcarbonates the solution contained 32.2 grams (0.1 mole) of free mercaptan, 6.3 grams (0.1 mole) of 90% potassium hydroxide, 500 ml. of acetone and 10 ml. of water. In addition, the reaction mixture was stirred at 25–30° C. for 24 hours. Following is illustrative of this group:

S - [6 - (1,2,3,4 - tetrahydro-2-thioxo-4,4,6-trimethyl-1-pyrimidinyl)-2-benzothiazolyl] O-ethylthiolcarbonate in 86.2% yield from ethyl chloroformate. The product was a yellow-green solid melting at 127–129° C. after recrystallization from ethyl alcohol. Analysis gave 10.02% nitrogen and 24.49% sulfur compared to 10.68% nitrogen and 24.44% sulfur calculated for $C_{17}H_{19}N_3O_2S_3$.

S - [6 - (1,2,3,4 - tetrahydro-2-thioxo-4,4,6-trimethyl-1-pyrimidinyl)-2-benzothiazolyl] O-methylthiolcarbonate in 79.2% yield from methyl chloroformate. The product was a brown solid melting at 120–122° C. after recrystallization from ethyl alcohol. Analysis gave 10.26% nitrogen and 25.00% sulfur compared to 11.07% nitrogen and 25.35% sulfur calculated for $C_{16}H_{17}N_3O_2S_3$.

S - [6 - (1,2,3,4 - tetrahydro-2-thioxo-4,4,6-trimethyl-1-pyrimidinyl)-2-benzothiazolyl] O-isopropylthiolcarbonate in 83.8% yield from isopropyl chloroformate. The product was a brown solid melting at 156–158° C. after recrystallization from ethyl alcohol. Analysis gave 9.78% nitrogen compared to 10.31% calculated for $C_{18}H_{21}N_3O_2S_3$.

S - [6 - (1,2,3,4 - tetrahydro-2-thioxo-4,4,6-trimethyl-1-pyrimidinyl)-2-benzothiazolyl] O-pentylthiolcarbonate in 45.9% yield from amyl chloroformate. The product was a tan solid melting at 142–144° C. after recrystallization from alcohol/acetone. Analysis gave 9.95% nitrogen and 21.79% sulfur compared to 9.65% nitrogen and 22.08% sulfur calculated for $C_{20}H_{25}N_3O_2S_3$.

O-allyl S-[6-(1,2,3,4-tetrahydro-2-thioxo-4,4,6-trimethyl - 1 - pyrimidinyl) - 2 - benzothiazolyl]thiolcarbonate in 14.9% yield from allyl chloroformate. The product was a tan solid melting at 133° C. with decomposition. Analysis gave 10.58% nitrogen compared to 10.36% calculated for $C_{18}H_{19}N_3O_2S_3$.

O,O' - oxydiethylene bis{S - [6 - (1,2,3,4-tetrahydro-2-thioxo - 4,4,6 - trimethyl-1-pyrimidinyl)-2-benzothiazolyl] thiolcarbonate} in 87.5% yield from one-half mole of

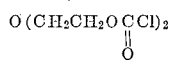

The product was a tan solid melting at 108° C. with decomposition. Analysis gave 9.98% nitrogen compared to 10.49% calculated for $C_{34}H_{36}N_6O_5S_6$.

O,O-ethylene bis{S-[6-(1,2,3,4-tetrahydro-2-thioxo-4,4,6 - trimethyl-1-pyrimidinyl)-2-benzothiazolyl]thiolcarbonate} in 87.0% yield from one-half mole of

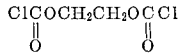

The product was a yellow solid melting at 135° C. with decomposition. Analysis gave 10.66% nitrogen compared to 11.10% calculated for $C_{32}H_{32}N_6O_4S_6$.

S-methyl S' - [6-(1,2,3,4-tetrahydro-2-thioxo-4,4,6-trimethyl - 1-pyrimidinyl)-2-benzothiazolyl]dithiolcarbonate in 93% yield from methyl chlorothiolformate. In this preparation 300 ml. of acetone and 10 ml. of water were employed to prepare the solution of free mercaptan. The product was a brown solid melting at 146–148° C. Analysis gave 10.67% nitrogen compared to 10.62% calculated for $C_{16}H_{17}N_3OS_4$.

Ethyl 6-(1,2,3,4-tetrahydro-2-thioxo-4,4,6-trimethyl-1-pyrimidinyl)-2-benzothiazolyldithiolcarbonate in 90.5% yield from ethyl chlorothiolformate. Again 300 ml. of acetone and 10 ml. of water were employed to prepare the solution of free mercaptan. After stirring at 25–30° C. for 24 hours, 300 ml. of water and 500 ml. of ethyl ether were added, stirring continued for 15 minutes and the reaction mixture filtered to remove a small amount of impurities. The ether layer was separated, washed with water until the washings were neutral to litmus and dried over sodium sulfate. Upon removal of ether in vacuo, a brown solid resulted melting at 135–137° C. after recrystallization from ethyl alcohol. Analysis gave 10.63% nitrogen and 30.75% sulfur compared to 10.26% nitrogen and 31.31% sulfur calculated for $C_{17}H_{19}N_3OS_4$.

As further illustrative of the invention, natural rubber tread stocks were compounded comprising:

| | Parts by weight |
|---|---|
| Smoked sheets rubber | 100.0 |
| Carbon black | 50.0 |
| Zinc oxide | 5.0 |
| Stearic acid | 3.0 |
| Saturated hydrocarbon softener | 3.0 |
| Sulfur | 2.5 |
| Antioxidant | 1.0 |
| Accelerator | 0.5 |

The accelerator added to the base stock is indicated below.

Stock:
A—S-[6-(1,2,3,4-tetrahydro-2-thioxo-4,4,6-trimethyl-1-pyrimidinyl)-2-benzothiazolyl] O-ethylthiolcarbonate
B—S-[6-(1,2,3,4-tetrahydro-2-thioxo-4,4,6-trimethyl-1-pyrimidinyl)-2-benzothiazolyl] O-methylthiolcarbonate
C—S-[6-(1,2,3,4-tetrahydro-2-thioxo-4,4,6-trimethyl-1-pyrimidinyl)-2-benzothiazolyl] O-isopropylthiolcarbonate
D—S-[6-(1,2,3,4-tetrahydro-2-thioxo-4,4,6-trimethyl-1-pyrimidinyl)-2-benzothiazolyl] O-pentylthiolcarbonate
E—O,O'-oxydiethylene bis{S-[6-(1,2,3,4-tetrahydro-2-thioxo-4,4,6-trimethyl-1-pyrimidinyl)-2-benzothiazolyl]thiolcarbonate}
F—O,O'-ethylene bis{S-[6-(1,2,3,4-tetrahydro-2-thioxo-4,4,6-trimethyl-1-pyrimidinyl)-2-benzothiazolyl]thiolcarbonate}
G—S-methyl S'-[6-(1,2,3,4-tetrahydro-2-thioxo-4,4,6-trimethyl-1-pyrimidinyl)-2-benzothiazolyl] dithiolcarbonate
H—Ethyl 6-(1,2,3,4-tetrahydro-2-thioxo-4,4,6-trimethyl-1-pyrimidinyl)-2-benzothiazolyldithiolcarbonate The stocks were cured in the usual manner by heating in a press for different periods of time at 144° C. Processing safety of the vulcanizable stocks was evaluated by means of a Mooney plastometer. The figures recorded were the times required for the Mooney plasticity at 135° C. to rise ten points above the minimum value. The modulus and tensile properties of the 60 minute cures are recorded:

TABLE I

| Stock | Modulus of elasticity in lbs./in.² at elongation of 300% | Tensile at break in lbs./in.² | Mooney Scorch at 135° C. |
|---|---|---|---|
| A | 1,610 | 2,380 | 10.3 |
| B | 1,400 | 2,220 | 15.7 |
| C | 1,500 | 2,440 | 10.5 |
| D | 1,400 | 2,340 | 11.1 |
| E | 1,400 | 1,950 | 10.7 |
| F | 1,500 | 2,380 | 10.6 |
| G | 1,550 | 2,670 | 13.0 |
| H | 1,490 | 2,520 | 13.7 |

It is intended to cover all changes and modifications of the examples of the invention herein chosen for purposes of disclosure which do not constitute departures from the spirit and scope of the invention.

What is claimed is:

1. A compound of the formula

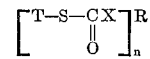

where T is 6-(1,2,3,4-tetrahydro-2-thioxo-4,4,6-trimethyl-1-pyrimidinyl)-2-benzothiazolyl, X is selected from a group consisting of oxygen and sulfur, $n$ is an integer equal to the valence of R selected from the group consisting of 1 and 2 and R is selected from the group consisting of lower alkyl, lower alkenyl, ethylene, and oxydiethylene.

2. Ethyl 6 - (1,2,3,4 - tetrahydro - 2 - thioxo - 4,4,6 - trimethyl - 1 - pyrimidinyl) - 2 - benzothiazolyldithiolcarbonate.

3. S - [6 - (1,2,3,4 - tetrahydro - 2 - thioxo - 4,4,6 - trimethyl - 1 - pyrimidinyl) - 2 - benzothiazolyl] O-methylthiocarbonate.

4. S - methyl S' - [6 - (1,2,3,4 - tetrahydro - 2 - thioxo-4,4,6 - trimethyl - 1 - pyrimidinyl) - 2 - benzothiazolyl]-dithiolcarbonate.

5. S - [6 - (1,2,3,4 - tetrahydro - 2 - thioxo - 4,6,6 - trimethyl - 1 - pyrimidinyl) - 2 - benzothiazolyl] O-ethylthiolcarbonate.

6. S - [6 - (1,2,3,4 - tetrahydro - 2 - thioxo - 4,4,6 - trimethyl - 1 - pyrimidinyl) - 2 - benzothiazolyl] O-isopropylthiocarbonate.

No references cited.

IRVING MARCUS, *Primary Examiner*.

NICHOLAS S. RIZZO, *Examiner*.